Figure 1:

Nov. 24, 1970   J. R. WHITE ET AL   3,542,715
FOAMED STRAND OF AN ORGANIC POLYMERIC MATERIAL
Filed Jan. 24, 1964

INVENTORS
JAMES RUSHTON WHITE
HERBERT BLADES

BY

ATTORNEY

United States Patent Office

3,542,715
Patented Nov. 24, 1970

3,542,715
FOAMED STRAND OF AN ORGANIC
POLYMERIC MATERIAL
James Rushton White, Chapel Hill, N.C., and Herbert
Blades, Wilmington, Del., assignors to E. I. du Pont de
Nemours and Company, Wilmington, Del., a corporation of Delaware
Continuation-in-part of application Ser. No. 227,861,
Oct. 2, 1962. This application Jan. 24, 1964, Ser.
No. 341,484
The portion of the term of the patent subsequent to
Jan. 4, 1983, has been disclaimed
Int. Cl. B29h 7/20; C08f 47/08; C08j 1/16
U.S. Cl. 260—2.5                                    6 Claims This invention is concerned with strands of cellular synthetic organic polymeric materials. More particularly it is concerned with strands which are useful in textile applications, and which have low density and high opacity by virtue of their cellular structure comprised of polyhedral thin walled cells.

This application is a continuation-in-part of copending application Ser. No. 227,861, filed Oct. 2, 1962, now abandoned, which is in turn a continuation-in-part of application Ser. No. 736,337, filed May 19, 1958, now abandoned, and application of James Rushton White Ser. No. 665,099, filed June 11, 1957, also now abandoned.

The prior art has recognized for some time the desirability of producing cellular filaments or strands. Several prior art techniques have therefore attempted to generate voids in preformed filaments by such methods as thermal decomposition of spun-in blowing agents, thermal vaporization of plasticizer or residual solvent, leaching out of spun-in fugitive solid particles, or even fiber drawing under such conditions that internal voids or cracks are generated. Other approaches have involved extrusion of molten polymers containing dissolved gas under high pressure whereupon internal voids are generated on extrusion into a lower pressure (normally atmospheric pressure) region. While these several methods have succeeded in producing filaments containing voids, the products generally can best be described as a matrix of polymer (in filament form) containing cavities which generally are irregular in size or shape. Such cavities do contribute desirable increases in fiber opacity (through light scattering at the polymer/void interfaces) and lower fiber density. However, the greatest effect is achieved only when the polymer content is reduced to the minimum, which requires a honeycomb-like structure of polyhedral cells, which may be referred to as a "drained foam." The cell walls thus become thin film-like sheets of polymer which intersect with adjacent walls in straight lines, with no build-up of excess polymer in globs or ridges. Such ideal cellular structures have not heretofore been known in the form of "infinitely long" products such as filaments or strands.

Accordingly, it is an object of this invention to provide a cellular strand of synthetic organic polymer whose cells are defined by thin polymer films in polyhedral configuration.

This object is acomplished by extruding through one or more small orifices a solution of an organic synthetic polymer in a suitable solvent heated to a temperature above the boiling point of the solvent such that on extrusion into a region of lower pressure, the solvent vaporizes substantially completely without the application of any additional external source of heat. This vaporization occurs essentially instantaneously with the formation of excedingly large numbers of bubble nuclei which grow into a soap suds-like foam of micro bubbles as the vaporization proceeds. The polymer is thereby precipitated in the form of a polyhedral thin-walled foam. If the spinning solution viscosity and extrusion velocity are relatively low, the cellular expansion is essentially isotropic, leading to cells whose average length/diameter ratio is essentially 1.0. If the solution viscosity and/or the extrusion velocity increase, the shear generated machine direction component affects the cellular expansion such that the average length/diameter ratio becomes larger than 1.0. Therefore it is a characteristic of these polyhedral cell filaments that the length/diameter ratio of the cells always exceeds or is equal to 1.0. Since both high viscosity (high polymer content) and high extrusion velocity offer attractive economies in commercial production, the preferred cellular products have length/diameter ratios in excess of 1.0, e.g. the cavities are longitudinally elongated.

Figure 2:
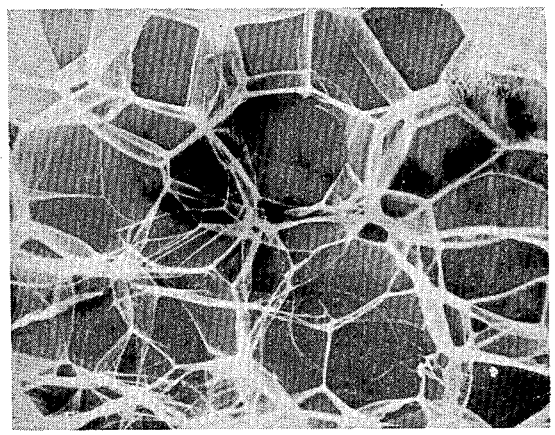

The wall thickness and cell dimensions are determined by microscopic examination of cross sections. Thus 20–60 micron thick sections may be cut from a frozen sample with a razor blade. Large cell (>50 microns) samples are frozen directly in liquid nitrogen. Smaller celled samples are preferably "imbedded" in water containing a detergent, and then frozen and sectioned. The dimensions of one or more cells can be readily measured by the freezing and sectioning technique mentioned above which at least partially inflates the cells. The cells will then exhibit a general polyhedral shape as illustrated in FIG. 2, similar to the shape of the internal bubbles in a foam of soap suds.

For optimum opacity, it is desirable that the cell wall thickness approach the dimensions of the wavelength of visible light. Furthermore, very thin polymer walls are required in order to achieve a compliant flexible cellular structure useful as a textile filament or strand. For these reasons wall thickness less than 2 microns are required, and thickness less than 1 micron are preferred. For textile applications, a minimum tenacity of 0.1 g.p.d. is preferred.

In efforts to achieve a very low density by increasing the ratio of solvent/polymer in the spinning solution, it is possible that the solvent vaporization on extrusion may become violent enough to rupture some of the cell walls. This invariably occurs with rupture of the end wall, e.g. the cell wall approximately perpendicular to the machine direction. These ruptures frequently occur in sequences, leading to strings of open-ended cells, which thus form tunnels. These tunnels are therefore oriented generally parallel to the machine direction.

A better understanding of the structure of the yarn-like strands of this invention may be obtained by reference to the drawings. FIG. 1 is a photograph of a cellular strand of this invention at 2× magnification. The high opacity provided by the multitudinous thin cell walls is readily apparent. The individual cells are too small to be detected at this magnification. FIG. 2 is a view at 2500× magnification of a cross-section of one of the cellular filaments of this invention. The polyhedral nature of the cell walls, as well as their thin film-like character is readily apparent. There is no appreciable accumulation of polymer at the intersection of cell walls.

The cellular strands of the present invention are produced by "flash spinning" a homogeneous solution comprising a synthetic fiber-forming polymer in an organic liquid which is a solvent for the polymer at the elevated temperature employed. The solution is extruded from a vessel, maintained at a temperature above the normal boiling point of the organic liquid and at superatmospheric pressure, through a spinneret containing one or more holes into a medium at a lower pressure, preferably air at normal atmospheric pressure. Temperature and pressure conditions in the vessel from which the solution is extruded, hereinafter referred to as "extrusion vessel," should be sufficiently high so that most of the solvent is flashed off immediately as the solution extrudes into the lower pressure region. The process of the present invention, in contrast to known solution spinning processes, operates at an extrusion temperature (temperature of the solution immediately prior to extrusion) substantially above the boiling point of the spinning solvent utilized, and preferably at least 40° C. above the boiling point of the solvent so that most of the solvent is flashed-off upon extrusion. Extremely high spinning speeds can be attained with the present process, frequently in excess of about 1000 y.p.m. per orifice.

Flashing-off of solvent during the spinning process of this invention is much like the flash evaporation of solvent in well-known flash distillation procedures. The rapid and substantial reduction in pressure upon the confined polymer solution when the extrusion orifice is opened results in an almost violent escape of solvent. It is surprising that despite the violent nature of the process indefinitely continuous strands are obtained.

As mentioned above, the extrusion vessel is kept at a temperature above the boiling point of the liquid used and at superatmospheric pressure. Autogenous or higher pressures may be employed.

The foamy cellular strands of this invention may be prepared from synthetic filament-forming polymers and polymer mixtures generally. These include polyamides, such as poly(hexamethylene adipamide), poly(hexamethylene sebacamide), polycaprolactam, etc.; polyesters, such as polyethylene terephthalate; polycarbonates; polyurethanes, such as described in U.S. Pat. Nos. 2,731,445 and 2,731,446; polyesters, such as polyformaldehyde, etc.; polyethylene, either linear or branched; other hydrocarbon polymers, such as polypropylenes, poly(isobutyl ethylene), ethylene copolymers with alkenes, vinyl acetate, etc.; vinyl polymers, such as polyvinyl chloride, polyvinyl fluoride, polyacrylonitrile, copolymers of acrylonitrile (preferably those prepared from monomers containing more than about 85% acrylonitrile), poly(tetramethyl butadiene), cellulose derivatives such as cellulose nitrate; etc.

The polymers useful in the present process are those which form homogeneous solutions at autogenous or higher pressures in a solvent or solvent mixture boiling at least 25° C. below the softening point of the polymer. Such solutions preferably are not homogeneous at room temperature; it is required only that a homogeneous solution of the polymer in the appropriate solvent exists at a temperature at least as high as the boiling point of said solvent or solvent mixture under autogenous or higher pressures.

The present process is operable in a wide range of spinning concentrations. The concentration of the polymer in the solvent can vary from 5 to about 90% by weight, preferably from 10 to 50%. Solvents useful in the present invention are those liquids which form a homogeneous solution with the polymer at elevated temperatures and pressures and having a boiling point at least 25° C. below the melting point of the polymer used. Among the solvents which may be utilized in this invention are aromatic hydrocarbons, such as benzene, toluene, etc., aliphatic hydrocarbons, such as butane, pentane, hexane, heptane, octane and their isomers and homologues; alicyclic hydrocarbons, such as cyclohexane; aliplatic halides, such as methylene chloride, carbon tetrachloride, chloroform, ethylchloride, methylchloride, alcohols; esters, ethers, ketones, nitriles, amides, fluorinated compounds, such as fluorohydrocarbons; sulfur dioxide, nitromethane; water; and mixtures of the above solvents. Of course, the solvent should be substantially unreactive with the polymer used. Some organic liquids can be used even if they do not form a homogeneous polymer solution under autogenous pressure in their superheated liquid form. They must, however, form a homogeneous solution with the polymer either at a temperature above their boiling point and a pressure above their autogenous pressure at the elevated temperature to be used, or in admixture with other solvents.

The process of the present invention can be carried out batchwise or continuously. In the case of continuous operation, a solution of polymer in a suitable solvent is heated to a suitable temperature. This solution may be supplied to an orifice by a metering pump. In such an arrangement, several containers may be used to make up the solution and several pressure tanks can be used to heat up the solution to the necessary pressure. Solutions are alternately taken from each of those tanks and discharged through the orifice. Alternatively, polymer and solvents may be mixed continuously at any suitable temperature, passed through a heat exchanger, if necessary, to attain the desired spinning temperature, and then continously discharged through the spinning orifice. Of course, the polymer can be prepared, i.e., polymerized, in the spinning solvent to produce a solution of the proper composition or concentration. This is advantageous since various other materials may be present in hte spinning solution without disturbing the spinning process. Solid particles of a size comparable or larger than the spinneret hole should be avoided. A homogeneous solution of the polymeric material in the appropriate solvent can contain various dyes, antioxidants, greases, etc., and even minor amounts of insoluble compounds of a particle size substantially smaller than the extrusion orifice, for example, catalyst residues, clays, pigments, asbestos, carbon black, silica, cross-linking accelerators, inhibitors, etc. Even with a substantial quantity of such additives or adventitious impurities in the spinning solution, a very white to snow white product is obtained, owing to the high light scattering power of the low density product. If the polymer used lends itself easily to discoloration at the elevated temperature, the air in the extrusion vessel is replaced advantageously by an inert gas.

A foamy filament has exceptional strength characteristics for such a bulky structure and can be used to advontage as a component in woven or knitted fabrics or as a low density resilient filling material in upholstery. Another utility is in synthetic papers. Such a filament can be cut into staple lengths and beat-up easily into a papermakers' pulp for the production of self-bonding 100% synthetic papers or can be used as a binder in combination with staple fibers of all kinds to form high strength, low weight fully or partially synthetic papers depending on the nature of the added staple fibers.

The following examples illustrate specific embodiments of the invention. All parts and percentages are by weight unless otherwise indicated.

EXAMPLE I

A 10% solution of a linear polyethylene, melt index of 0.5, in cyclohexane at 195° C. and under 500 p.s.i. is extruded as a sponge yarn into an open container at normal atmospheric pressure. The orifice has a diameter of 30 mils and a length of 30 mils and is preceded by a Hoke valve No. 327. The continuous strand is produced at a rate of approximately 12,000 y.p.m. at a denier of 250, a tenacity of 1.0 g.p.d. (coned), an elongation of 93% and an initial modulus of 2.8 g.p.d. After drawing this yarn, it has a denier of 134, a tenacity of 2.5 g.p.d., an elongation of 30%, and an initial modulus of 24 g.p.d.

EXAMPLE II

A 20.4% solution of "Delrin" polyformaldehyde of Flow Number 0.7 in acetonitrile heated to 200° C. in a closed, agitated vessel at autogenous pressure is discharged through an orifice 75 mils long, 75 mils in diameter, and preceded by a No. 327 Hoke valve. A spongy continuous strand is obtained.

EXAMPLE III

Polystyrene is dissolved in methyl chloride to form a solution with 30% solids. This mixture is heated in a closed vessel to 130° C. at autogenous pressure and extruded through a number 327 Hoke valve and an orifice 50 mils long and 50 mils in diameter to produce a very fibrillated continuous strand of high covering power. This filament is readily beatable into a pulp for the manufacture of paper.

By raising the concentration of the above solution to 45% and lowering the spinning temperature to 120° C., a spongy, foamy yarn without fibrillation is obtained. This yarn is also beatable into a papermarkers' pulp.

EXAMPLE IV

A mixture of 80 grams poly(ethylene terephthalate), 125 cc. of methylene chloride, and 75 cc. of cyclohexane, is heated within 1 hour to 215° C. in a closed extrusion vessel and extended through an orifice 75 mils long and 75 mils in diameter. A spongy, heavy, white, continuous yarn of little strength but high covering power is obtained. This low density porous yarn has a denier of about 2000 and is beatable into a very smooth papermakers' pulp, prior to forming a good quality 100% synthetic paper therefrom.

EXAMPLE V

Forty grams poly(hexamethylene adipamide) in 200 cc. water is heated within 45 minutes to 210° C. and subsequently heated 15 minutes at 240° C. A tan spongy, weak yarn is flash spun through a 50 mils diameter, 50 mils long orifice, preceded by a Hoke valve No. 327. This yarn can also be beaten into a papermakers' pulp.

Replacing poly(hexamethyle adipamide) by poly(caprolactam) and extruding it at 204° under the same conditions also gives a white spongy yarn with properties similar to the above.

EXAMPLE VI

Forty grams of "Delrin" polyformaldehyde of Flow Number 0.7 in 100 cc. of acetonitrile is heated in the extrusion vessel to 190° at autogenous pressure. A spongy yarn is extruded through an orifice of 50 mils diameter and 50 mils length. The yarn readily beats up into a papermakers' pulp which proves to be an excellent additive for kraft paper to increase dry and wet strength.

EXAMPLE VII

A linear polyethylene of melt index 20 dissolved in methylene chloride to a 13.5% solids containing solution is extruded at 185° C. through an orifice of 50 mils diameter and 60 mils length preceded by a Hoke Inc. valve (Englewood, N.J.) part number 327, to produce a spongy yarn of a denier of 182, a tenacity of 0.10 g.p.d., an elongation of 30%, and an initial modulus of 0.6 g.p.d. This continuous yarn is useful for the preparation of papermakers' pulp.

EXAMPLE VIII

Linear polyethylene of melt index 20 is dissolved in cyclohexane to produce a solution containing 13% solids which is extruded from a bomb at 200° C. and autogenous pressure through a round orifice of 75 mils diameter and 75 mils length preceded by a Hoke valve number 327 to give a similarly useful spongy filament.

EXAMPLE IX

A 31% polyethylene terephthalate, 3% fibrous asbestos, and 66% methylene chloride mixture is heated to 190° C. and extruded through a 327 Hoke valve. The spinneret is 50 mils long and 50 mils in diameter. A spongy yarn is obtained having a tenacity of 0.3 gram per denier which can be drawn at 150° C. over a pin to increase its tenacity.

EXAMPLE X

A 1 liter nickel bomb is charged with 200 g. of poly(vinyl chloride) (inherent viscosity 0.99 in tetrahydrofuran, dried at 40° C. for 16 hours in vacuum), 250 ml. of methylene chloride (dried 24 hours over calcium hydride) and 10 ml. of "Themolite"[1] 31. It is closed and heated to 195° C. The bomb is rotated end over end to form a uniform solution. A pressure of 850 p.s.i.g. of nitrogen gas is applied to the vertically positioned bomb and the contents extruded into the atmosphere through an orifice 0.020 inch in diameter by 0.060 inch long. Flash evaporation of methylene chloride gives a continuous, cellular filament capable of being wound onto bobbins. The cells are substantially closed, and immersion in a mixture of equal portions of dichlorofluoromethane and 1,1,2-trichloro-1,2,2-trifluoroethane gives fully inflated pneumatic foamed fibers. Cross-sections of these inflated fibers show polyhedral shaped cells of 30–740μ diameter. The cell walls are less than 1 micron in thickness. The inherent viscosity of the colorless foamed fiber is 0.92 in tetrahydrofuran.

The above extrusion is repeated, substituting poly(vinyl chloride) resin of inherent viscosity 1.13 in tetrahydrofuran, adding 44 g. of fluorotrichloromethane, heating to 185° C. using 700 p.s.i. nitrogen gas pressure and extruding through an orifice 0.018 inch in diameter and 0.028 inch long. The product again is a continuous, colorless, foamed strand. Immersion of this strand in a mixture containing equal parts of dichlorofluoromethane and octafluorocyclobutane gives a turgid, round filament having a density of 0.011 g./cc. The bubbles range from 20 to 150μ diameter and the inherent viscosity of the fiber is 1.00 in tetrahydrofuran.

Another extrusion is performed, charging 40 g. of poly(vinyl chloride) resin, 200 ml. of methylene chloride, and 2.5 ml. "Thermolite" 31. A solution is formed at a temperature of 175° C., and is extruded through an orifice 0.075 inch diameter and 0.075 inch long to produce a spongy cellular strand.

EXAMPLE XI

A mixture of 25 g. of polyacrylonitrile, 95 ml. of acetonitrile, and 40 ml. of water is stirred in a blender while adding a suspension of 0.15 g. of "Santocel"[2] 54 in 23 ml. water. The thick suspension is blended for ¾ hr. and transferred to a 285-ml. bomb. The bomb is fitted with a sealed spinneret having a single hole 15 mils in diameter and 10 mils long and then pressurized with carbon dioxide at 300 p.s.i.g. It is held stationary with the spinneret down, heated to 180° C. and held there for ½ hr. During this time the polymer coalesces to a heavy viscous mass, covered by a layer of excess solvent. When the spinneret is opened, the viscous material issues rapidly to form a foamed continuous strand. The foam shrinks as the vaporized solvents cool, but the gaseous carbon dioxide trapped in the bubbles gives rise to a permanently pneumatic structure. X-ray examination of this type of yarn shows the "usual ANP order," sometimes interpreted as a type of crystallinity. Density of the strand is about 0.06 to 0.10 g./cc.

EXAMPLE XII 140 g. "Elvanol" 72–60 (Du Pont's trademark for polyvinyl alcohol containing 1% of residual acetate groups), 4.2 g. of "Santocel" 54, 20 g. of water and 38 g. of ethanol are loaded under a nitrogen pressure of 300 p.s.i.g. into a cylindrical pressure vessel of 300 cc. capacity. The mixture is heated for a 3 hour period at 180° C. with agitation and continuously extruded thereafter under a nitrogen pressure of 900 p.s.i.g. through a one-hole spinneret (20 mils wide x 20 mils long) placed at one end of the vessel. The extruded strand is white and is comprised of polyhedral cells having walls less than 1 micron thick.

Similar polyvinyl alcohol cellular strands are prepared from PVA/water and PPVA/anhydrous ammonia systems.

EXAMPLES XIII 70 g. of a hydrolyzed ethylene-vinyl acetate copolymer (containing originally 28 wt. percent vinyl acetate units;

---

[1] Trademark of M & T Chemicals Inc. for a tin based stabilizer for vinyl resins.

[2] Trademark for Monsanto Chemical Co.'s silica aerogel insulating and flattening agent.

melt index 2–3), 1.0 g. of "Santocel" 54, and 70 ml. of methylene chloride are loaded into a cylindrical pressure vessel of 275 cc. capacity. The mixture is heated for a 6 hour period at 150° C. with agitation, and continuously extruded thereafter under a nitrogen pressure of 600 p.s.i.g. through a one-hole spinneret (25 mils wide x 50 mils long) located at one end of the vessel. The physical properties, measured at 21° C. and 65% R.H. of the white cellular filament so produced, are given in Table I.

TABLE I

| | |
|---|---|
| Tenacity, g./den. | .4 |
| Elongation/1000. | 70 |
| Initial modulus, g./den. | .6 |
| Work-to-break, g./den. | .15 |

The filament collapses to a denser form in a matter of hours following the extrusion, but can be permanently reinflated by soaking in boiling 1,1,2-trifluoro-1,2,2-trichloroethane or perfluorocyclobutane.

EXAMPLE XIV

A 30-gram charge of a rubbery copolymer of hexafluoropropylene and vinylidene fluoride is sealed in a 250 ml. spinning bomb and the air pumped out. A mixture of 25 g. liquid ethyl chloride and 25 g. of chlorodifluoromethane is forced in with nitrogen gas at 200 p.s.i.g. The polymer is brought into solution by heating the bomb to 95° C. for 45 min., while rotating the bomb slowly end-over-end. The bomb is then held stationary with the spinneret (15 mils x 10 mils) in the downward position, while the solution is rested free of bubbles. When the spinneret is opened, the solution issues rapidly to form a foamed continuous elastic strand. After standing for 3 days, the foamed strand has a density of 0.35 g./cc. compared with a bulk polymer density of 1.8 g./cc. The cellular strand is soft, springy, and resilient.

EXAMPLE XV

A charge composed of 40 g. of a random copolyester containing 80% ethylene terephthalate and 20% ethylene isophthalate and 28 ml. of dichloromethane is sealed in a 270 ml. stainless steel bomb fitted with a spinneret having a hole 12 mils in diameter and 20 mils long. The spinneret hole is covered and 10 g. of liquid dichlorodifluoromethane is forced in through a valve by nitrogen under a pressure of 200 p.s.i.g. The polymer is brought into solution by rotating the bomb slowly end-over-end and heating it gradually to 165° C. After being mixed 10 minutes at 165° C., the solution is allowed to rest 10 minutes, with the spinneret at the bottom. When the hole is opened, the solution issues in a few seconds to form a continuous, white, opaque, pneumatic cellular strand which recovers well from crushing. The strand, after standing several days, has a density of 0.05 g./cc. Analysis shows 65% closed cells, 32% open cells, and 5% walls.

EXAMPLE XVI

A 30 g. charge of a random copolyester containing 55 mole-percent ethylene terephthalate and 45 mole-percent ethylene sebacate is sealed in a 250 ml. stainless steel bomb fitted with a spinneret having a hole 20 mils in diameter and 10 mils long. The bomb and spinneret opening are closed and the air pumped out. A mixture of 30 g. of ethyl chloride and 20 g. of dichlorodifluoromethane is forced in through a valve by nitrogen under a pressure of 200 p.s.i.g. The polymer is brought into a solution by rotating the bomb slowly end-over-end for 1 hour at 130° C. The bomb is then cooled to 120° C. and the solution mixed ½ hour and allowed to rest ¼ hour to remove gas bubbles. When the spinneret is opened, the solution issues rapidly to form a continuous cellular, white opaque elastic strand. The density of strand is 0.064 g./cc. Microscopic examination of the polyhedral cells shows the average bubble size is 10 x 6 microns, with walls approximately 0.1 micron thick. Yarns prepared in a similar manner have shown a tenacity of 0.18 g.p.d. and an elongation of 150%.

EXAMPLE XVII

A charge composed of 30 g. of polyvinylidene fluoride and 30 ml. of dichloromethane is sealed in a 340 ml. bomb fitted with a spinneret having a hole 20 mils in diameter and 10 mils long. The spinneret hole is covered and 10 g. of liquid dichlorodifluoromethane is forced in through a valve by nitrogen under 200 p.s.ig. pressure. The bomb is rotated slowly end-over-end while it is heated to 140° C. Mixing is continued for 1 hour, after which the solution is allowed to rest out for ½ hour with the spinneret at the bottom. When the hole is opened, the solution issues rapidly, forming a white, tough, springy polyhedral-celled strand. The strand has a density of 0.044 g./cc.

EXAMPLE XVIII

A spinning bomb fitted with a spinneret having a hole 20 mils in diameter and 10 mils long, is charged with 50 g. of the sodium salt of a random copolymer formed of ethylene and methacrylic acid (90:10 weight ratio of respective units in the copolymer), 0.3 g. of "Santocel" 54, 40 ml. of cyclohexane, 40 ml. of tetrahydrofurane, and nitrogen at 400 p.s.i.g. The spinneret hole is covered and the bomb rotated end-over-end. The temperature is slowly raised to 150° C. Mixing is continued for 2 hours after which the solution is allowed to rest out for ½ hour with the spinneret at the bottom. When the hole is opened, the charge issues fairly slowly (75 seconds) to give a somewhat sticky cellular strand which, after short aging, was smooth, round, white, turgid, tough and elastic. The density is 0.06 g./cc. Microscopic examination shows closed polyhedral cells averaging 27 x 51 microns, with walls having an average thickness of 1 micron.

EXAMPLE XIX

A charge composed of 50 g. of the free acid form of the random copolymer of Example XVIII, 40 ml. of dichloromethane and 0.3 g. of "Santocel" 54 is sealed in a 340 ml. bomb fitted with a spinneret having a hole 20 mils in diameter and 10 mils long. The spinneret hole is covered and 7 g. of dichlorodifluoromethane is forced in through a valve by nitrogen at 200 p.s.i.g. pressure. The charge is mixed by rotating the bomb end-over-end. The temperature is raised slowly to 150° C. Mixing is continued for 2 hours, and the solution then rested out for ½ hour with the spinneret at the bottom. When the hole is opened, the charge issues in 17 seconds (930 yards per minute calculated jet velocity). The cellular strand has a pycnometer density of 0.067 g./cc. Microscopic examination shows the cells to be mostly open, ranging in size from 7 x 15 microns to 20 x 40 microns, with walls less than 1 micron thick.

What is claimed is:

1. A foam strand of a fiber-forming synthetic organic polymeric material which foam is composed predominantly of wall material generally having a thickness of less than about 2 microns, said wall material having a polyhedral configuration, and defining longitudinally elongated closed cavities.

2. A foam like strand of linear polyethylene, said foam being composed predominantly of wall material having in general a thickness of less than about 2 microns, said wall material having a polyhedral configuration, and defining longitudinally elongated, closed cavities, and said strand having a tenacity of at least 0.1 gram per denier.

3. A cellular strand of fiber-forming synthetic organic polymeric material wherein the cells are defined by walls of thin polymer films in polyhedral configuration, substantially all of the polymer constituting cell walls and the wall thickness being less than about 2 microns.

4. The cellular strand of claim 3 wherein the cells of the strand in the length direction have an average length/diameter ratio of no less than 1.0.

5. The cellular strand of claim 3 wherein the cells of the strand in the length direction have an average length/diameter ratio of greater than 1.0.

6. A cellular strand of a fiber-forming synthetic organic polymeric material wherein the cells are defined by walls of thin polymer films in polyhedral configuration, substantially all of the polymer constituting cell walls and the wall thickness being less than about 2 microns, said strand having a tenacity of at east 0.1 gram per denier.

References Cited

UNITED STATES PATENTS

| | | | |
|---|---|---|---|
| 3,067,147 | 12/1962 | Rubens et al. | 260—2.5 |
| 3,227,664 | 1/1966 | Blades et al. | 260—2.5 |
| 2,666,036 | 1/1954 | Schwencke | 260—2.5 |
| 2,880,057 | 3/1959 | Cuculo | 260—2.5 |
| 2,888,415 | 5/1959 | Jankens | 260—2.5 |
| 2,904,840 | 9/1959 | Hochreuter | 260—2.5 |
| 2,905,648 | 9/1959 | Haas | 260—2.5 |
| 3,118,161 | 1/1964 | Cramton | 260—2.5 |

FOREIGN PATENTS 854,586  11/1960  Great Britain.

MURRAY TILLMAN, Primary Examiner

M. FOELAK, Assistant Examiner

U.S. Cl. X.R.

139—420; 161—57, 142, 159; 260—33.6, 33.8, 41; 264—41, 118, 205